(12) United States Patent
Panizzon

(10) Patent No.: US 7,862,407 B2
(45) Date of Patent: Jan. 4, 2011

(54) DEVICE FOR SECTIONING INDIVIDUAL SAUSAGES OF CONTINUOSLY EXTRUDED PRODUCT

(75) Inventor: Giuseppino Panizzon, Malo VI (IT)

(73) Assignee: Refin S.R.L., Vicenza (IT)

( * ) Notice: Subject to any disclaimer, the term of this patent is extended or adjusted under 35 U.S.C. 154(b) by 1003 days.

(21) Appl. No.: 10/492,315

(22) PCT Filed: Oct. 14, 2002

(86) PCT No.: PCT/IT02/00654

§ 371 (c)(1),
(2), (4) Date: Sep. 30, 2004

(87) PCT Pub. No.: WO03/030646

PCT Pub. Date: Apr. 17, 2003

(65) Prior Publication Data

US 2006/0185529 A1 Aug. 24, 2006

(30) Foreign Application Priority Data

Oct. 12, 2001 (IT) .......................... RM2001A0609

(51) Int. Cl.
*A22C 13/02* (2006.01)

(52) U.S. Cl. ............................. 452/29; 452/30; 452/46; 452/25; 452/41

(58) Field of Classification Search ................... 99/494, 99/516, 353, 450.1, 450.2, 450.6, 352, 355, 99/441; 426/513, 516, 37, 277, 105; 452/46–51, 452/21–31, 35, 42

See application file for complete search history.

(56) References Cited

U.S. PATENT DOCUMENTS

| 1,442,232 A | 1/1923 | Neuberth ...................... 452/47 |
| 4,569,101 A * | 2/1986 | Tribbett .................... 425/133.1 |
| 4,614,005 A | 9/1986 | Townsend |
| 4,776,266 A * | 10/1988 | Bradshaw, Jr. ................ 99/353 |

(Continued)

FOREIGN PATENT DOCUMENTS

DE          1027548          9/1958

(Continued)

OTHER PUBLICATIONS

Notice of Opposition Filed (EP1464490) (in German) and its translation in English language.

(Continued)

*Primary Examiner*—Mark H Paschall
*Assistant Examiner*—Brian Jennison
(74) *Attorney, Agent, or Firm*—Steinfl & Bruno LLP

(57) ABSTRACT

The present invention concerns a device (1) for portioning a food product (3) continuously extruded from a filling apparatus, preferably for making meat-base elongated extrusions in form of sausages, frankfurters and the like, wherein two front and opposed pincers (4) carry out a succession of neckings onto the extrusion (3), via outwardly and inwardly reciprocating alternate motions therebetween parallel, carried out by plural gearings, the kinematic motion enabling the pincers (4) to carry out axial displacement s concomitantly to said reciprocating motions, so as to follow the extruded product (3) in the feeding direction thereof and in predetermined lengths which are variable by variably adjusting the angular velocities of said gearings.

18 Claims, 6 Drawing Sheets

U.S. PATENT DOCUMENTS

| | | | |
|---|---|---|---|
| 5,049,108 A | | 9/1991 | Staudenrausch |
| 5,098,332 A | * | 3/1992 | Handel ........................ 452/46 |
| 5,129,315 A | * | 7/1992 | Burwell et al. ............. 99/450.2 |
| 5,145,451 A | | 9/1992 | Staudenrausch ............. 452/48 |
| 5,173,075 A | * | 12/1992 | Wadell ........................ 452/46 |
| 5,788,563 A | * | 8/1998 | Nakamura et al. ............ 452/47 |
| 6,419,968 B1 | * | 7/2002 | Wang et al. ................. 426/277 |

FOREIGN PATENT DOCUMENTS

| | | |
|---|---|---|
| EP | 0392083 | 4/1993 |
| EP | 0868852 A2 | 10/1998 |
| GB | 716783 | 10/1954 |

OTHER PUBLICATIONS

Famco Sausage Linkers, Product Brochure.

Auszug aus ‚Hutte, die Grundlagen der Ingenieurswissenschaften, Auflage, Springer Verlag, 30$^{th}$ Ed., 1996.

International Search Report for PCT/IT2002/000654 filed on Oct. 14, 2002 in the name of Giuseppino Panizzon.

EP Examination Report of Jul. 12, 2004 for EP02785915.6 filed on Oct. 14, 2002 in the name of REFIN S.r.l.

Opponent's letter of Aug. 18, 2009 for EP02785915.6 filed on Oct. 14, 2002 in the name of REFIN S.r.l. (With English Translation).

Applicant's response of Jan. 20, 2005 to the EP Examination Report of Jul. 12, 2004 for EP02785915.6 filed on Oct. 14, 2002 in the name of REFIN S.r.l.

Applicant's response of May 29, 2008 to Notice of Opposition filed by VEMAG Maschinenbau GmbH on Oct. 17, 2007 against European Patent 1434490 (App. No. EP02785915.6).

* cited by examiner

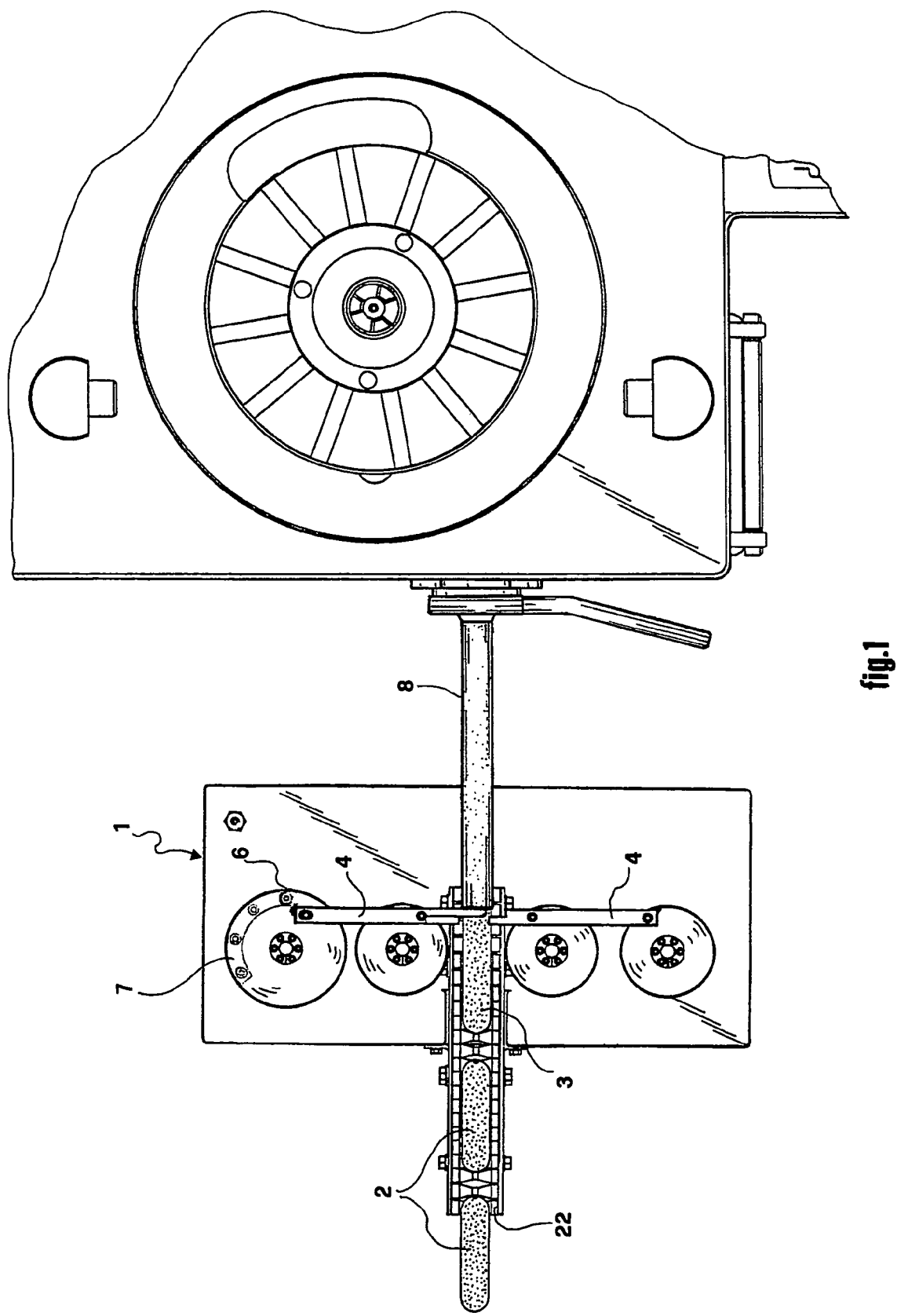

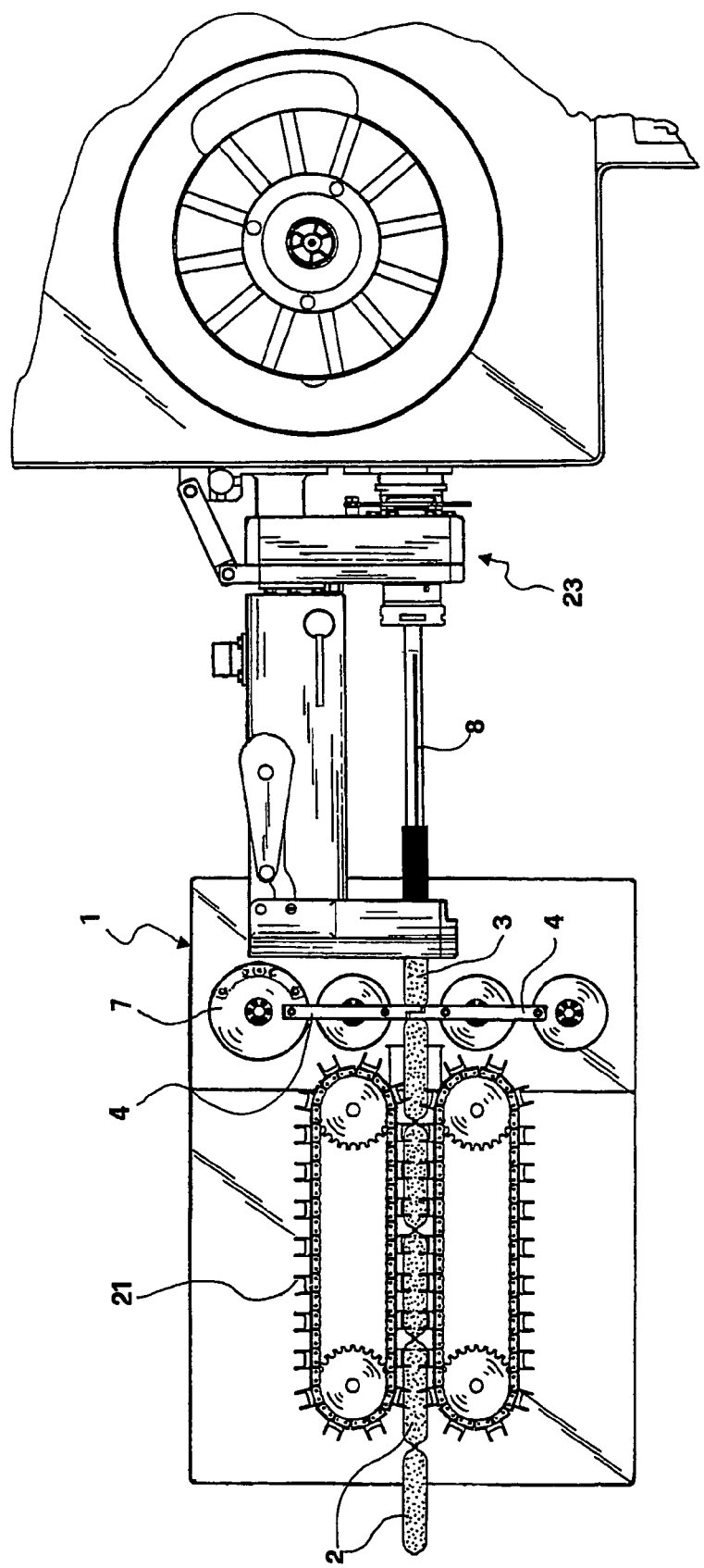

DEVICE FOR SECTIONING INDIVIDUAL SAUSAGES OF CONTINUOSLY EXTRUDED PRODUCT

1. FIELD OF THE INVENTION

The present invention refers to a portioning device for food products continuously extruded from a filling apparatus.

2. STATE OF THE ART

There are several known systems for portioning food extrusions following a conditioning of the surface of the latter, in order to manufacture sausage-shaped extrusions, cased or uncased and ready to be packaged, e.g. in tubs or in vacuum packages. Typically, in these systems there is provided a pair of opposed pincers carrying out outwardly or inwardly translating motions so as to generate a necking.

However, these systems entail the drawback of lacking a portioning station apt to portion the extruder-outletted extruded product variably and synchronically to the extrusion rate, so as to realize portions of variable length.

Hence, object of the present invention is to overcome said drawback by providing a device for portioning food extruded products that be apt to portion the extruder-outletted food extrusion at a speed variable with respect to the extrusion rate, thereby making food extrusion sections of variable length.

3. DESCRIPTION OF THE INVENTION

Therefore, the present invention provides a device for sectioning a continuously extruded product according to claim 1.

The invention will hereinafter be described according to a preferred embodiment thereof, given by way of example and without limitative purposes, with reference to the attached drawings, wherein:

FIG. 1 depicts, schematically and from the top, the portioning device according to the present invention incorporated in an extrusion apparatus;

FIG. 2 schematically depicts the device of the present invention incorporated in a different extrusion apparatus;

Figure 6:
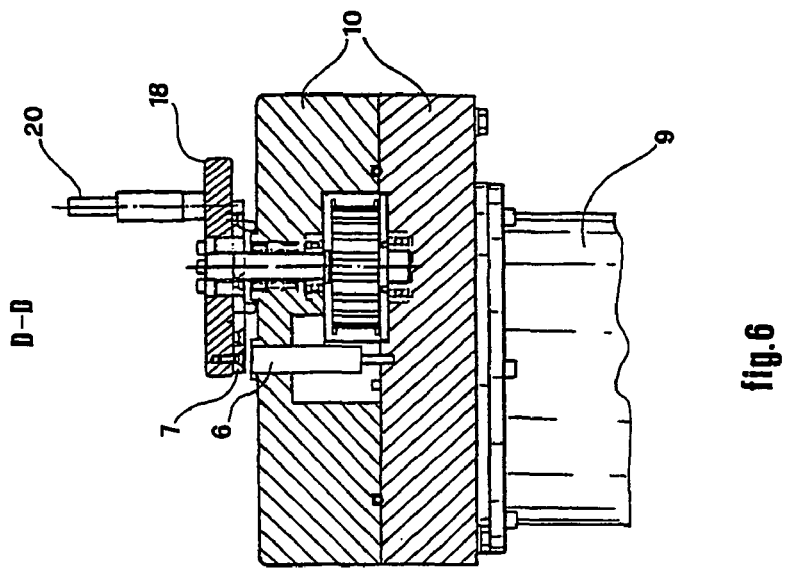
FIG. 6 shows a cross section of the extrusion device of the present invention.

With reference now to FIGS. 1 and 2, according to the present invention it is provided that the portioning device 1 be located at the outlet of a filling pipe 8 apt to extrude a food product 3 in order to attain a compacting thereof with means unindurious to the newly-conditioned surface of the extrusion 3 (all better illustrated hereinafter).

The extrusion apparatus will not be detailed hereinafter, as it pertains to the state of the art and not to the present invention.

More precisely, and as it is illustrated in FIG. 2, the device 1 of the present invention as described hereto is dedicated to the sectioning into individual sausages 2 of a continuously extruded product 3. However, with a particular shape of the pincers 4 (better illustrated hereinafter), the same sectioning device 1 is likewise apt to constitute an ancillary device for sectioning and twisting a food product-filled flexible tubular casing (the so-called 'gut'), forming a peduncle between a sausage and another subsequent sausage.

The individual sausages 2 thus made are conveyed away from the device 1 by a further conveying device. The conveying device may have shaped and opposed twin belts or chains 21, or a slanting race 22 made of a set of idle conical rollers that let the sausages gravity-fall on an optional downstream-located container.

According to this embodiment, the casing is periodically rotated onto the extrusion pipe 8 by a brake actuated by a drive 23. Concomitantly, and synchronously to the braking and twisting system 23, the two pincers 4 engage a filled product portion, thereby making a peduncle thereat. The sausages thus made, twisted and separated by a peduncle, are conveyed away from the portioning device by the abovedescribed conveying device.

Figure 3:
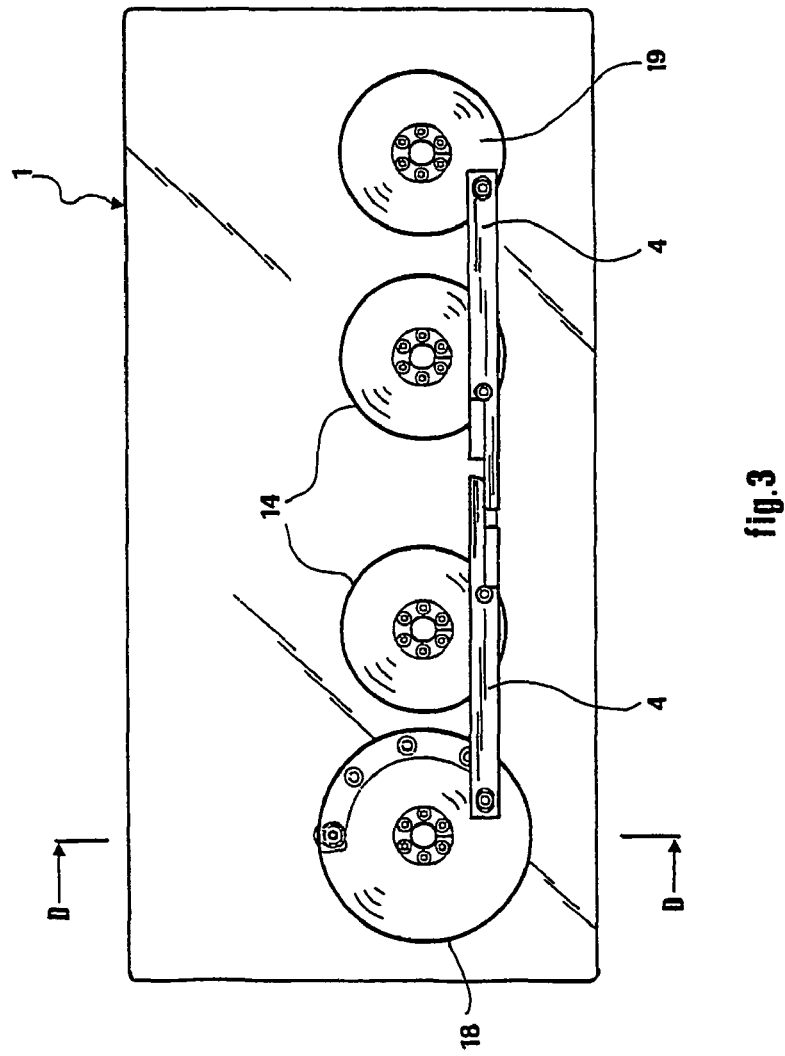
FIG. 3 is an elevational front view of the device of the present invention.
Figure 4:
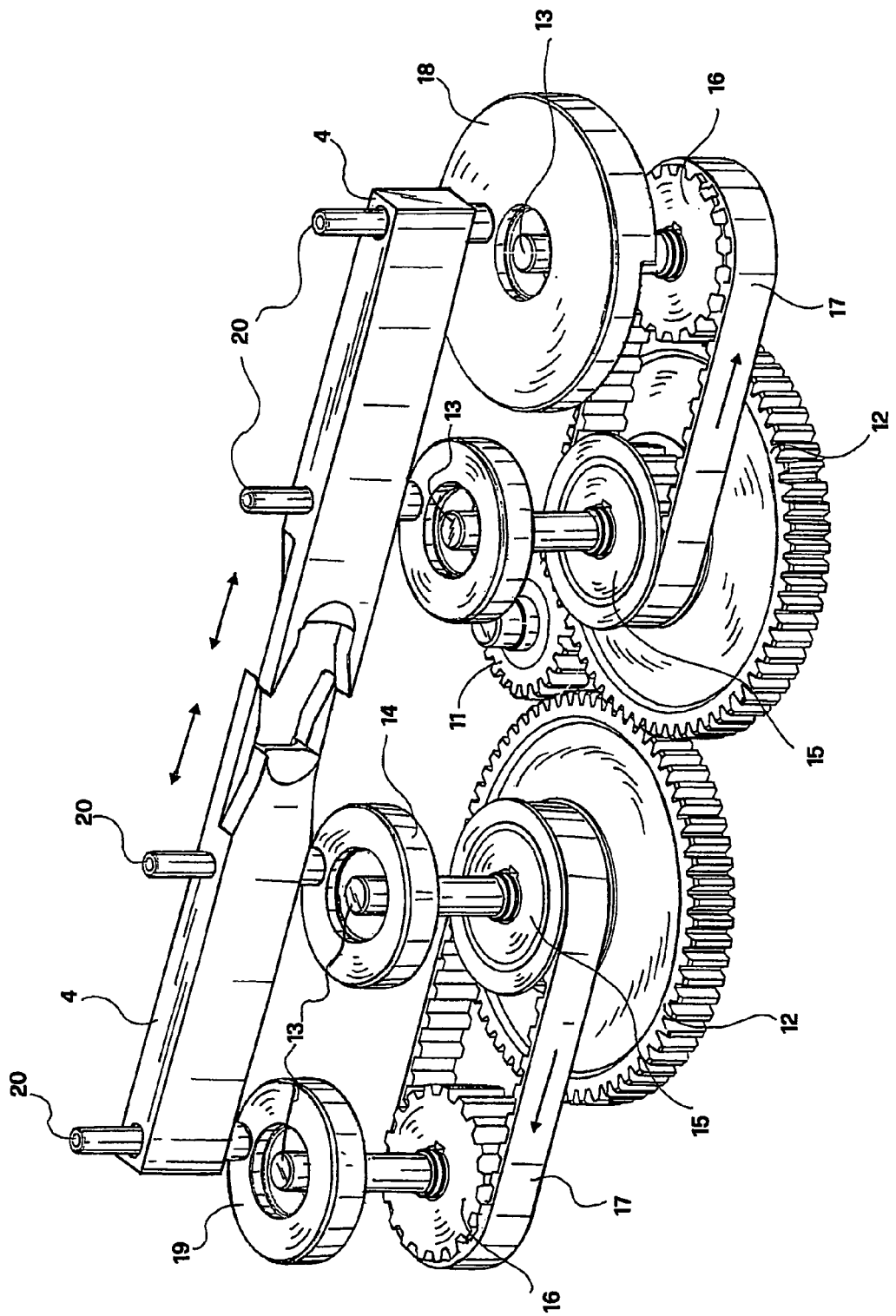
FIG. 4 shows the gear drive and the related pincers of the device of the present invention.

With reference now to FIGS. 3, 4 and 6, it is provided that the portioning device 1 according to the present invention comprise a motor 9 power-supplying a gearbox 10 which houses a gear drive comprising a pinion 11 and two gears 12. More precisely, and as it is better illustrated in FIG. 4, the gears are coupled via two respective shafts 13 to two wheels 14 projecting from the gearbox 10, and to two driving pulleys 15 thereinside. Preferably, for the sake of practicality and of effectiveness of implementation, the motor is of DC type.

The two driving pulleys 15 drive two further driven pulleys 16 via a toothed belt 17. The driven pulleys 16 in turn drive two further wheels 18 and 19, via two shafts. It has to be pointed out that this type of drive provides a synchronous coupling with an opposite direction of rotation between the two wheel pairs.

On the other hand, each wheel pair is coupled to a pincer 4 hinged on two pins 20, each of the latter being positioned at a set radial distance with respect to the axis of rotation of the respective wheels 14, 18, 19 onto which it is mounted. Thus, the pincers 4 are frontally abutting and apt to swing cyclically, following the rotation of the wheels, so as to move outwardly and inwardly the one with respect to the other.

More precisely, the motion of the pincers 4 is subdivided in a first and a second step, generated by a different speed of the motor 9. In the first step, in which the pincers contact the product outletted from the extrusion pipe 8 generating the necking and the entailed sectioning of the same product, the pincer velocity component, which is parallel to the outlet direction of the extruded product 3, is required to be equal to or anyhow slightly greater than the outlet rate thereof.

In the second step, so-called non-operative and in which there is no contact between the pincers 4 and the extruded product 3, the speed of rotation of the wheels 14, 18 and 19, and therefore of the pincers 4, may be varied with suitable control means (not shown in the FIGS.) so as to obtain different lengths of sausage 2.

For this purpose, and with particular reference to FIG. 6, the synchronizing between the first step of necking and the non-operative step takes place via the use of a sensor 6, which detects the exact position of the pincers by contacting a circle-shaped sector 7 located onto the wheel 18.

Figure 5A:
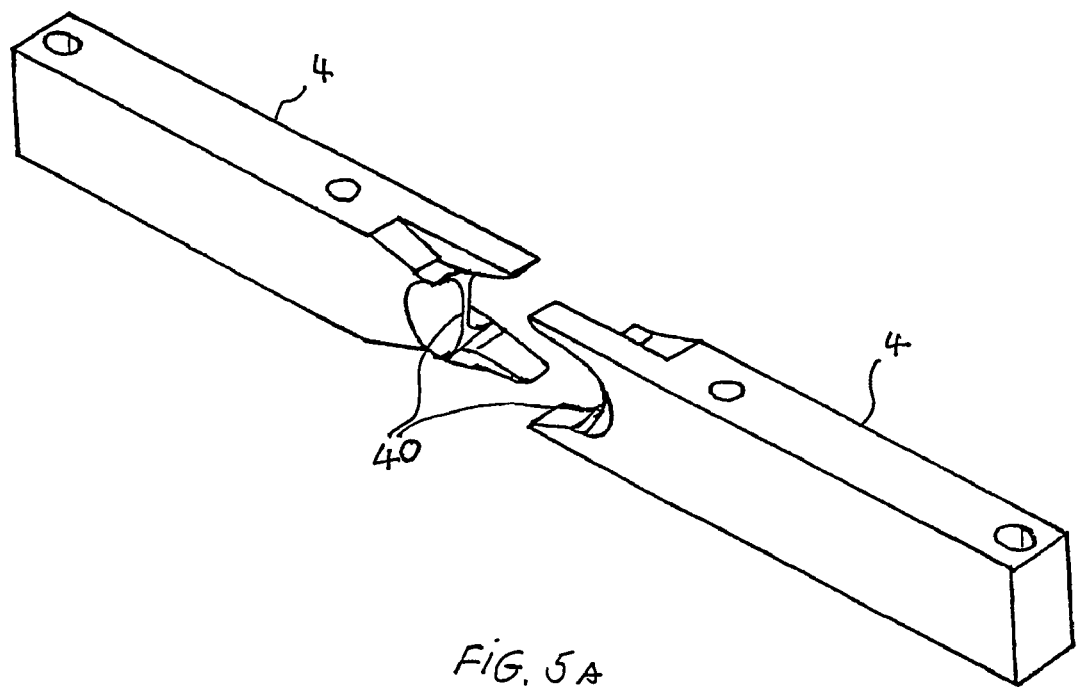
FIGS. 5A, 5B, 5C and 5D show four different types of pincers of the device of the present invention.

With reference now to FIG. 5A, a first embodiment of the pincer 4 according to the device of the present invention is illustrated. This first embodiment of pincer is applied to a device as illustrated in FIG. 1 in which the shaping of uncased extruded product and the portioning thereof into individual sausages is required.

Therefore, each pincer 4 is shaped so as to have a substantially C-shaped end and two hemispheric caps 40 on both sides thereof. This shape makes the end of the pincer 4 apt to house a portion of the extruded product 3 outletted from the extrusion pipe 8 into the respective hemispheric regions 40 and, following the transversal swinging of each of the two pincers 4, to neck the surface of the extruded product 3 and to subsequently make individual sausages or portions 2 downstream of the extruded product 3.

Figure 5B:
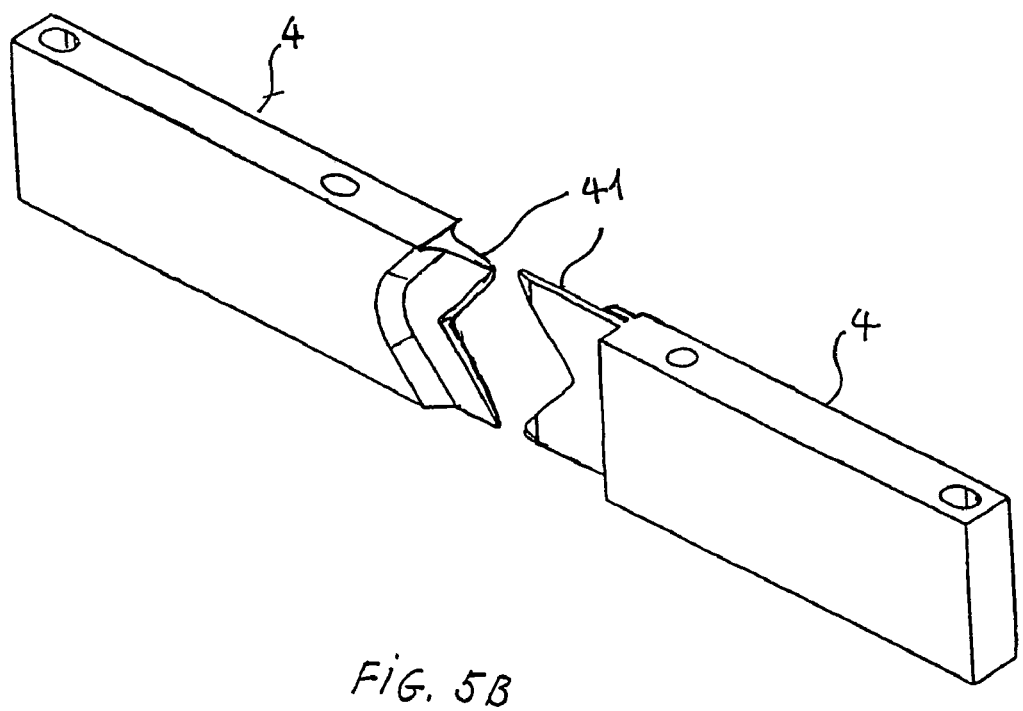

FIG. 5B shows a second embodiment of the pincer 4 of the device of the present invention, according to which the employ thereof in an apparatus as in FIG. 2 is provided. Said apparatus provides a necking of the cased extruded product and a subsequent twisting thereof, without however separating or cutting the casing. For the sake of simplicity, alike reference numbers will indicate alike components.

According to this embodiment, the end of each pincer 4 has a substantially V-shaped end region 41. This shape makes the end of the pincer 4 apt to neck the surface of the extruded product 3, and to subsequently make individual sausages or portions 2, downstream of the extruded product 3, without however separating the casing containing the latter.

Figure 5C:
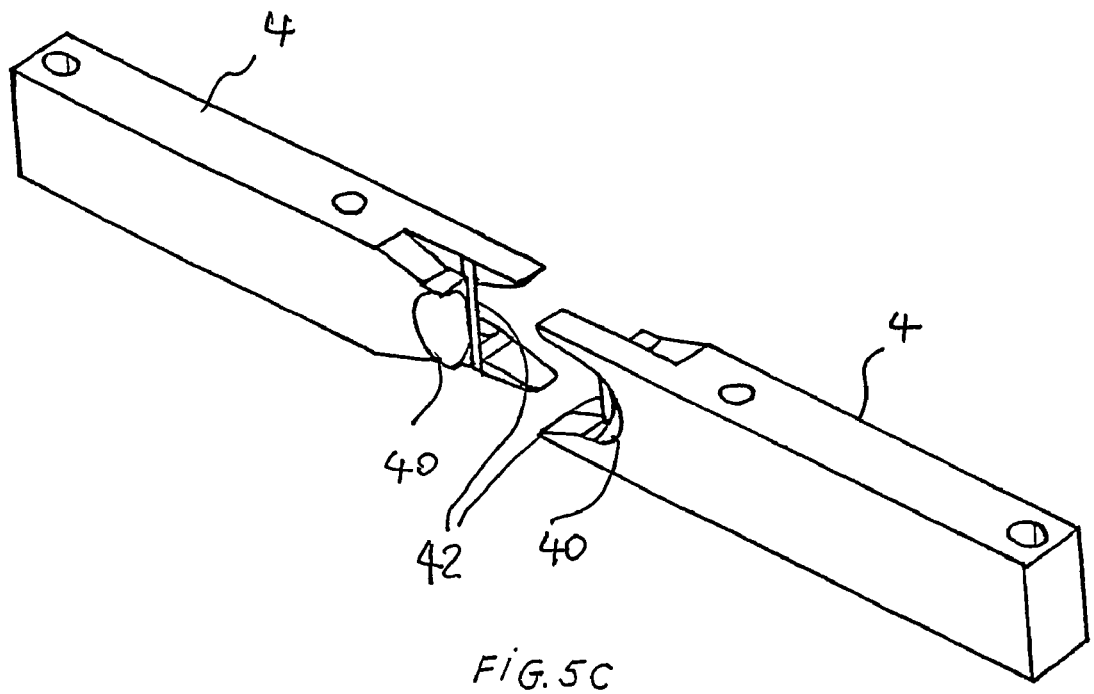

With reference now to FIG. 5C, a third embodiment of the pincer 4 of the device of the present invention is illustrated. In this case as well, for the sake of simplicity, alike reference numbers will indicate alike components. This embodiment is particularly indicated for cutting a cased extruded product. More precisely, this third embodiment differs from the first embodiment illustrated in FIG. 1 in that the former at one end thereof has a blade 42 located onto the free edge of the hemispheric region 40. The presence of the blade 42 ensures a safe cutting of the extrusion 3 following the necking and the making thereof.

Figure 5D:
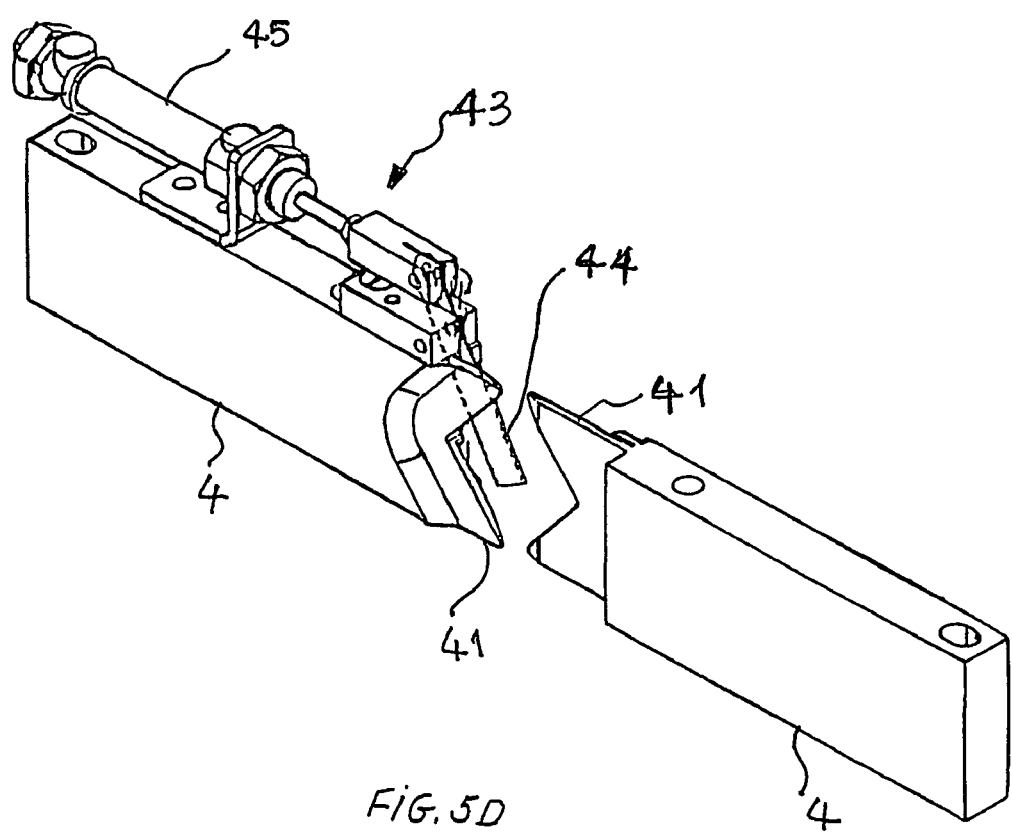

With reference now to FIG. 5D, a fourth embodiment of the pincers d4 of the device of the present invention is illustrated. As in the preceding embodiments, for the sake of simplicity alike reference numbers will indicate alike components.

According to this fourth embodiment, in case a casing is adopted, and, additionally to the necking and twisting steps (hereto described according to the apparatus of FIG. 2) it be desirable to portion the extruded product 3 into individual sections, a second cutting device 43 mounted on a pincer 4 should be implemented. More precisely, the cutting device 43 provides a blade 44 that is swingably mounted onto one of the two pincers 4. The blade 44 is fulcrumed on a fixed portion of the pincer 4 and it is coupled to a pneumatic actuator 45 or the like mounted at the top of the pincer 4. Thus, following the operation of the actuator 45, a further cutting pressure can be exerted onto the casing of the extrusion 3 at the necking spot thereof, with the related making of a necked casing peduncle, so as to ensure an accurate separation of the latter.

Moreover, the pneumatic actuator 43 is controlled by the sensor 6. The latter will control the cutting of the casing during the rotary translation of the pincer 4.

The invention claimed is:

1. A device for portioning a continuously extruded food product coming out from a filling apparatus, the device comprising two pincers having respective portioning ends, wherein each pincer is mounted and lies on a pair of driving wheels, the pairs of driving wheels being configured to move said pincers outwardly and inwardly with a reciprocating motion with respect to the continuously extruded food product to be portioned, both
   in an orthogonal direction and
   in a parallel direction to that of feeding the continuously extruded food product, synchronically to and during a same portioning of the continuously extruded food product.

2. The device of claim 1, wherein each pincer is rod-shaped and has a substantially "C-shaped" end, each pincer being rotatably mounted onto drive gears driven by a motor.

3. The device of claim 1, wherein a predetermined length of the continuously extruded food product to be portioned is obtained by adjusting and maintaining constant an angular velocity of the pair of pincers in a non-operative time sector thereof by a predetermined value which is directly related to a length of a portion of the continuously extruded food product to be formed.

4. The device of claim 1, wherein a step of necking of the continuously extruded food product is implemented at a variable angular velocity on each degree of a sector covered and such that an axial speed component of the pair of pincers is equal to an axial feed rate of the continuously extruded food product.

5. The device of claim 1, wherein synchronizing of the pair of pincers between an angular sector related to a step of necking and a remaining angular sector is obtained by means of a position sensor.

6. The device (1) of claim 1, wherein each pincer of the pair of pincers has the end thereof shaped to forming and/or sectioning an end portion of the continuously extruded food product to be portioned.

7. The device of claim 6, wherein each pincer of said pincers has at an end thereof a pair of substantially hemispheric surfaces apt to form and/or divide ends of an uncased continuously extruded food product to be portioned.

8. The device of claim 6, wherein each pincer of said pincers has at an end thereof a substantially V-shaped necking region apt to neck the continuously extruded food product when the continuously extruded food product is contained in a casing of animal or synthetic origin.

9. The device of claim 6, wherein each pincer at one end thereof has a pair of substantially hemispheric surfaces and a blade so as to form and divide ends of an uncased continuously extruded food product to be portioned.

10. The device of claim 6, wherein said pincers further comprise a second cutting device for sectioning the continuously extruded food product when the continuously extruded food product is contained in a casing of animal or synthetic origin.

11. The device of claim 10, wherein said second cutting device comprises:
   a blade swingably mounted onto a pincer at a forming and/or necking region thereof; and
   a pneumatic actuator, coupled to said blade and mounted at a top of said pincer,
   the blade, pneumatic actuator, and pincer in an arrangement being such that following an operation of the actuator a further cutting pressure is exerted onto said extruded product.

12. The device of claim 2, further comprising:
   a frame apt to house a gear drive coupled to said motor;
   a drive comprising four aligned pulleys and coupled to said gear drive, of said four pulleys two central pulleys being driving pulleys having opposed direction of rotation, whereas the other two pulleys of said four pulleys are driven pulleys that are driven via toothed belts respectively;
   four wheels coupled each to a respective pulley of said four pulleys; and
   four pins fixedly mounted at a determined radial distance onto each wheel of said four wheels and for mounting said pincers in a rotatable manner.

13. The device of claim 1, wherein each pincer has a rod-shaped portion, the rod-shaped portion being mounted on the pair of driving wheels.

14. The device of claim 1, wherein each pincer is rotatably coupled to a pair of pins, each pin of the pair of pins being positioned on an angular sector, and at a radial distance with respect to a rotation axis, of the respective driving wheel.

15. The device of claim 1, wherein the wheels of each pair of driving wheels are aligned along a direction orthogonal to that of the continuously extruded food product.

16. The device of claim 1, wherein the device includes a motor and control means, said motor being configured to have different motor speeds which generate
- a motion of the pincers in a step of portioning of the continuously extruded food product, wherein, during the step of portioning, the speed of the pincers in the parallel direction is substantially equal to a speed of the continuously extruded food product, and which generate
- a motion of the pincers in a non-operative step of the pincers wherein, during the non-operative step, the speed of the pincers is variable by means of said control means in order to generate portions of variable length of the continuously extruded food product.

17. A device for portioning a continuously extruded food product coming out from a filling apparatus, the device comprising two pincers having respective portioning ends, wherein each pincer is rotatable coupled to a pin of a driving wheel, said pin being positioned on an angular sector, at a radial distance with respect to a rotation axis, of the driving wheel, the driving wheels of the two pincers being configured to move said pincers outwardly and inwardly with a reciprocating motion with respect to the continuously extruded food product to be portioned, both in an orthogonal direction and in a parallel direction to that of feeding the continuously extruded food product, synchronically to and during a same portioning of the continuously extruded food product.

18. A device for portioning a continuously extruded food product coming out from a filling apparatus, the device comprising two pincers having respective portioning ends, wherein each pincer is mounted on a pair of driving wheels, the driving wheels of one pair being aligned with the driving wheels of the other pair along a direction orthogonal to the direction of feeding the continuously extruded food product, the driving wheels of the two pincers being configured to move said pincers outwardly and inwardly with a reciprocating motion with respect to the continuously extruded food product to be portioned, both in an orthogonal direction and in a parallel direction to that of feeding the continuously extruded food product, synchronically to and during a same portioning of the continuously extruded food product.

* * * * *